Aug. 16, 1932.  C. J. BREHANY  1,871,876
ONE-KNOB CONTROL FOR RADIO RECEIVING SETS
Filed Dec. 21, 1929  5 Sheets-Sheet 1
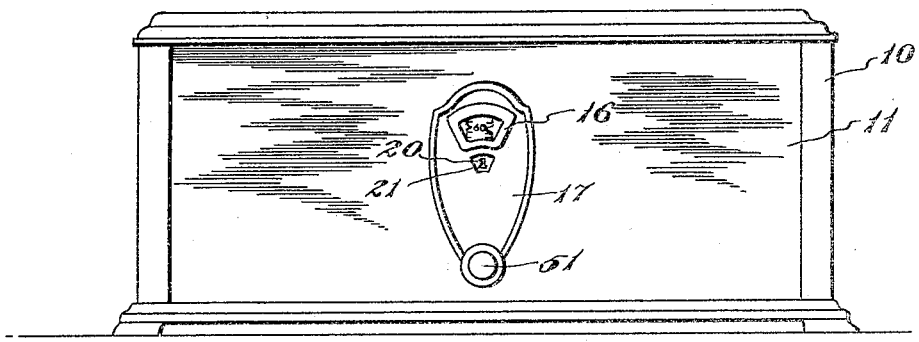
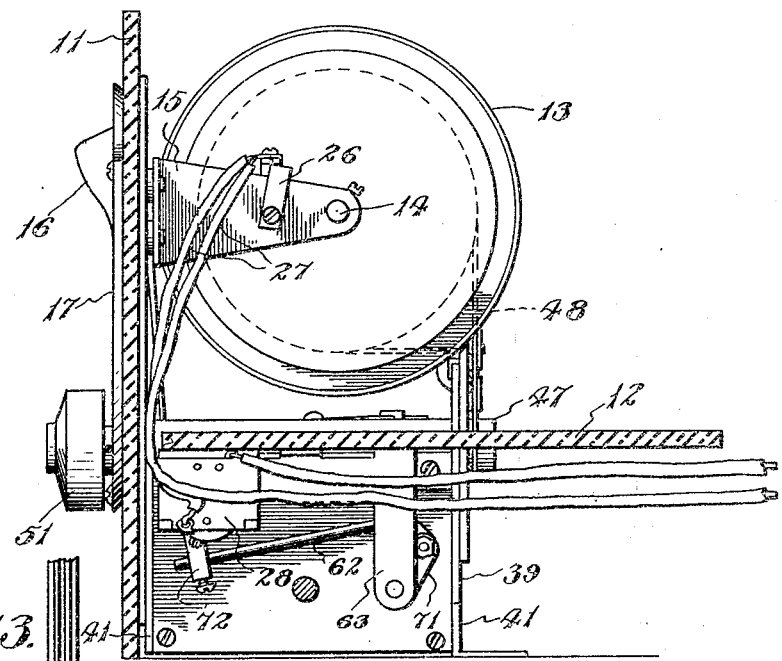
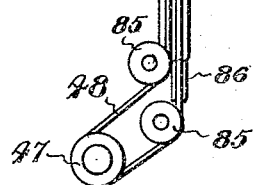
Inventor
C. J. Brehany
By Lacey & Lacey,
Attorneys

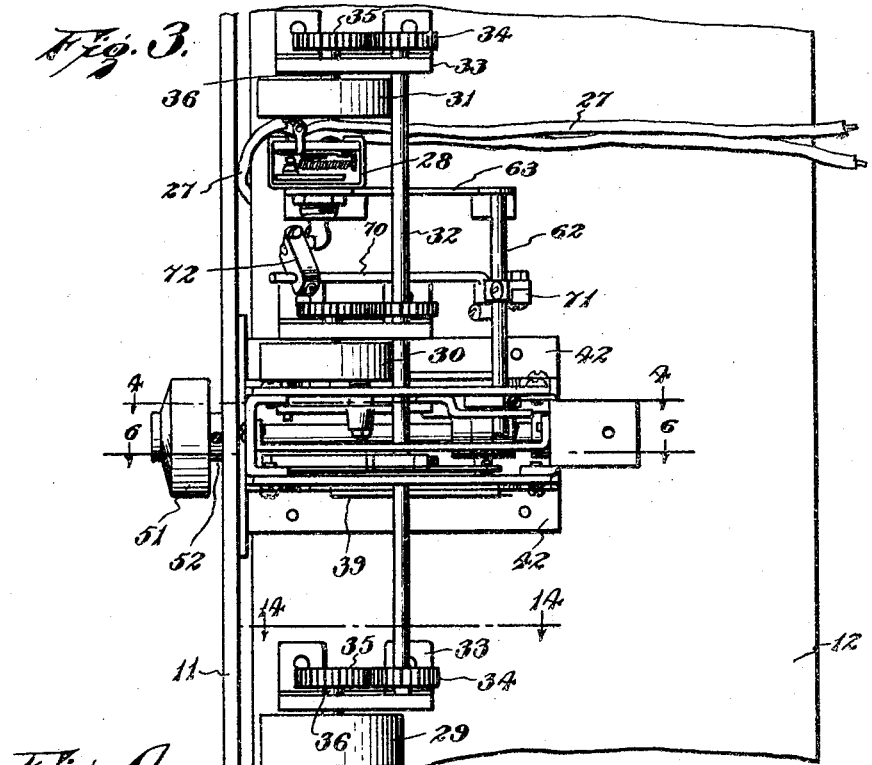
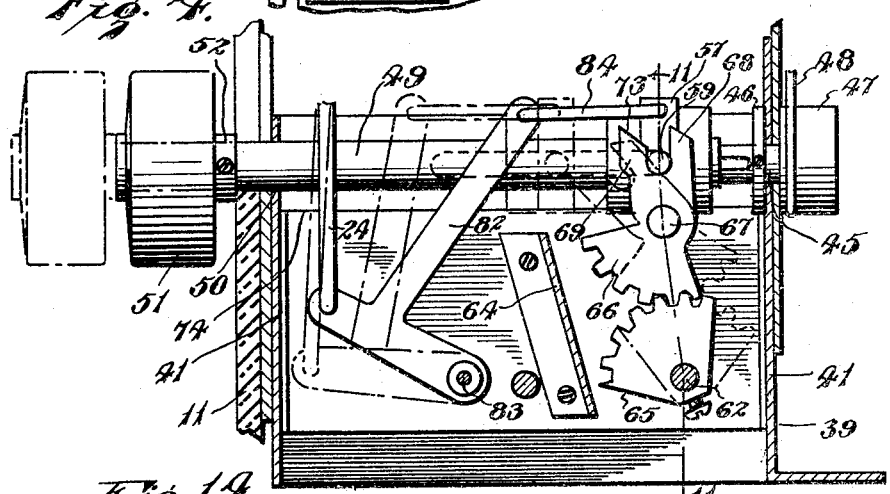
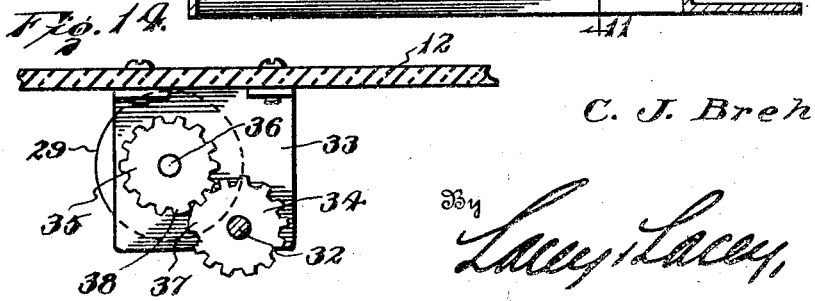

Aug. 16, 1932.  C. J. BREHANY  1,871,876
ONE-KNOB CONTROL FOR RADIO RECEIVING SETS
Filed Dec. 21, 1929  5 Sheets-Sheet 3
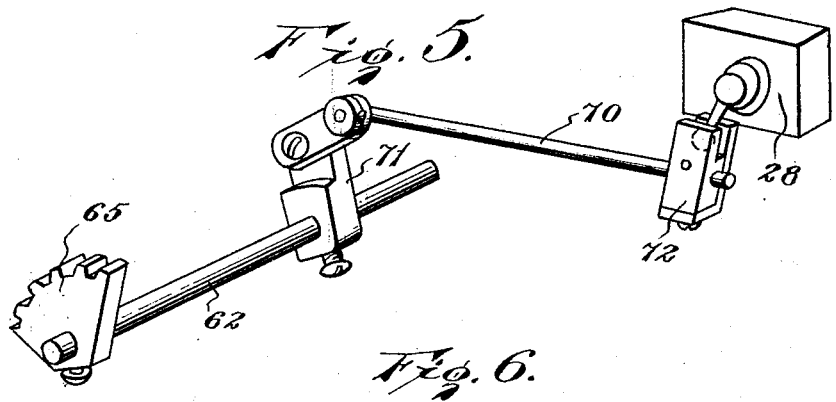
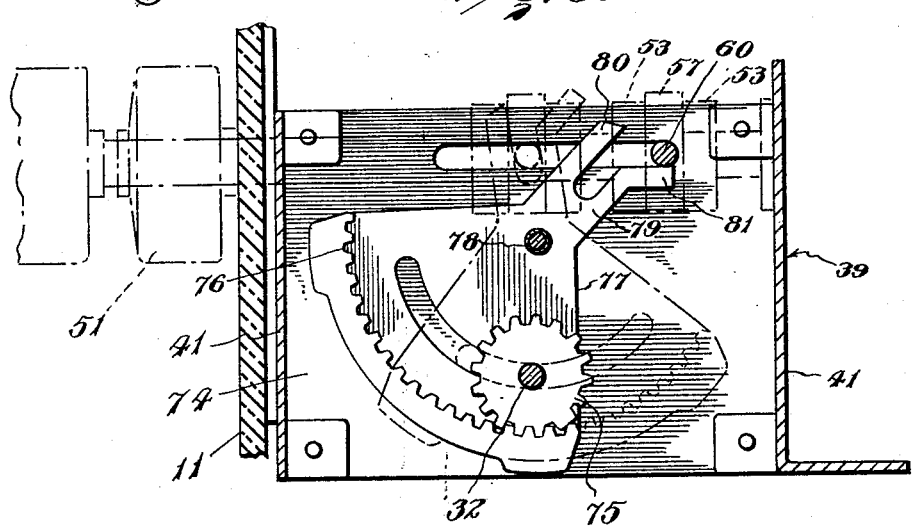
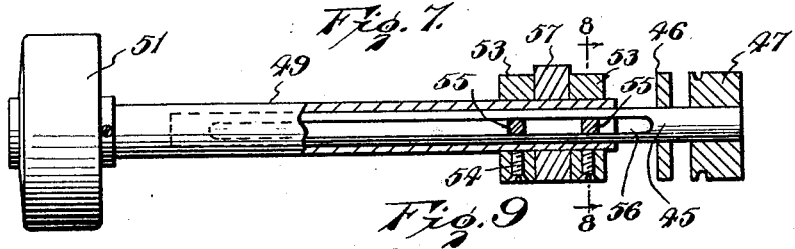
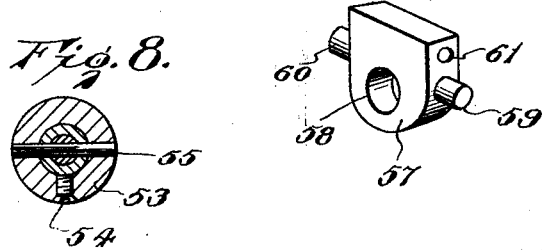
Inventor
C. J. Brehany
By Lacey & Lacey, Attorneys

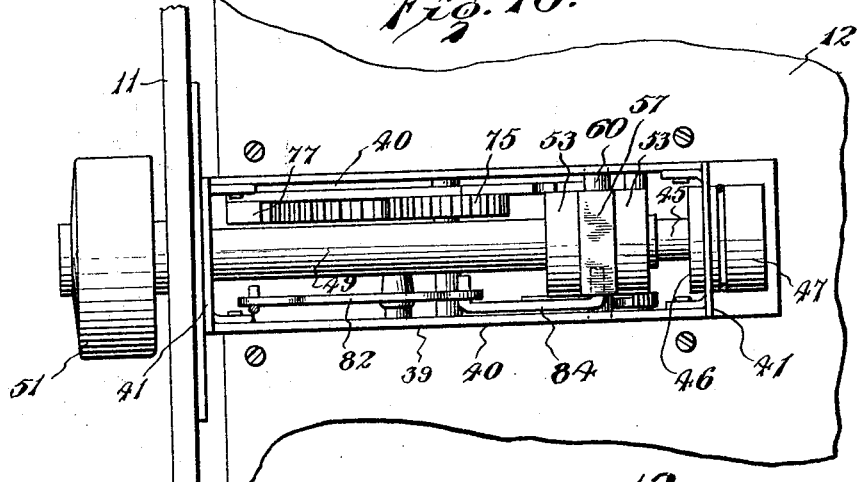
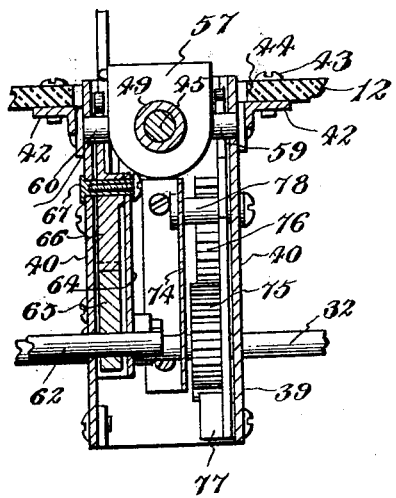
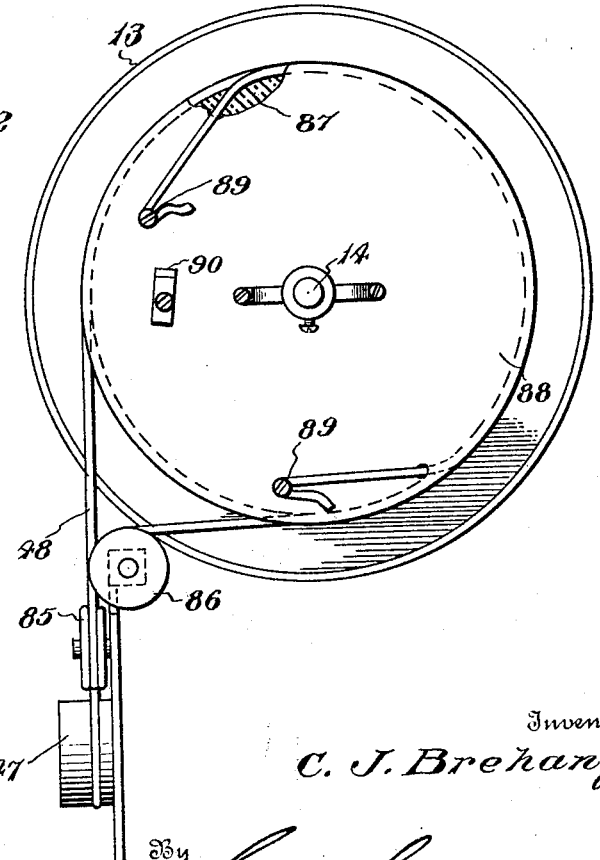

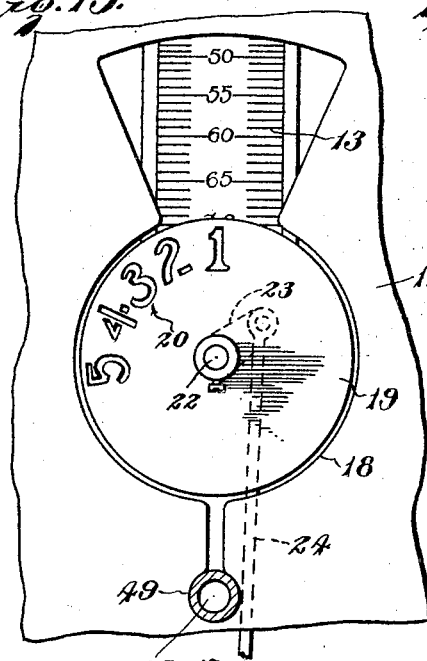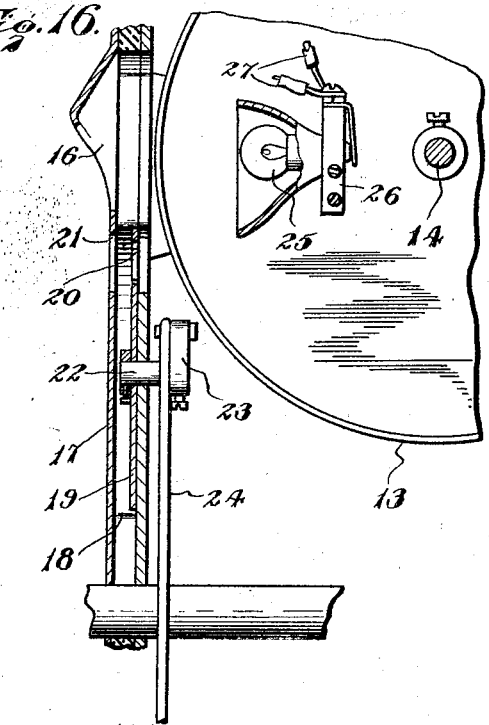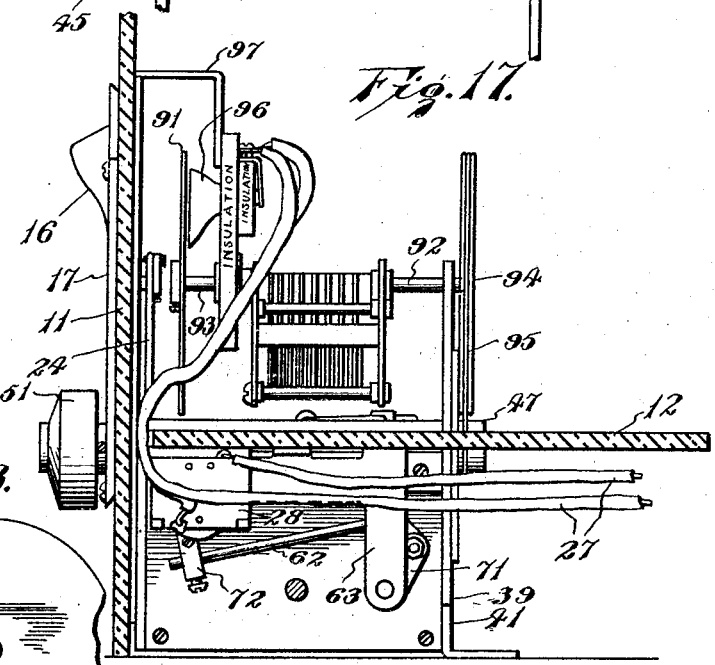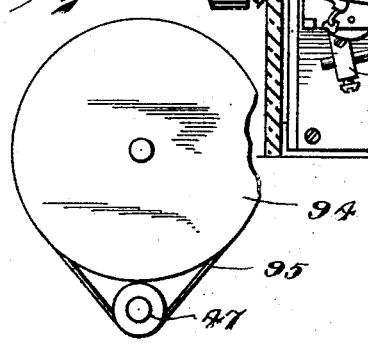

Patented Aug. 16, 1932

1,871,876

UNITED STATES PATENT OFFICE

CHARLES J. BREHANY, OF MIDDLETOWN, OHIO

ONE KNOB CONTROL FOR RADIO RECEIVING SETS

Application filed December 21, 1929. Serial No. 415,701.

This invention relates to radio receiving sets and has for an object to provide a simplified control wherein the tuning, volume, filament lighting and dial lighting mechanisms are all controlled by a single knob.

A further object of the invention is to provide an indicator whereby when the single knob is manipulated to increase or decrease the volume such change will be indicated by a corresponding numeral illuminated by the pilot light.

A still further object is to provide a single knob control wherein when the knob is rotated the set will be tuned in the usual manner and when the knob is pulled outwardly the volume will be correspondingly increased, the knob being rotatable at any outward position whereby tuning of the set may be effected at any desired volume.

A still further object is to provide a single knob control mechanism which may be applied to either the drum type or the flat disc type of tuning dial without extensive alterations to the receiving set.

With the above objects in view the invention consists in certain novel details of construction and combinations of parts hereinafter fully described and claimed, it being understood that various modifications may be resorted to within the scope of the appended claims without sacrificing any of the advantages or departing from the spirit of the invention.

In the accompanying drawings,

Figure 1 is a front elevation of a radio receiving set embodying the invention,

Figure 2 is a vertical sectional view showing the invention incorporated in a receiving set of the drum tuning dial type, Figure 3 is an underneath view showing the parts secured to the bottom of the sub-panel, Figure 4 is an enlarged fragmentary vertical sectional view showing the parts operated by the knob for actuating the filament switch and the volume indicator dial, Figure 5 is a perspective view of the lever mechanism which operates the filament switch, Figure 6 is an enlarged vertical sectional view showing the parts which operate the volume control instruments, Figure 7 is a detail sectional view with parts in elevation of the knob and parts carried thereby, Figure 8 is a detail cross-sectional view on the line 8—8 of Figure 7, Figure 9 is a detail perspective view of the shift collar, Figure 10 is a plan view of the housing for the parts with the tuning drum removed, Figure 11 is a vertical sectional view on the line 11—11 of Figure 4, Figure 12 is a side elevation of the dial drum, pulleys and cable for operating the drum, Figure 13 is a fragmentary end elevation of the pulley and cord operating devices of the drum, Figure 14 is a detail cross-sectional view taken on the line 14—14 of Figure 3.

Figure 15 is a fragmentary front elevation with the escutcheon plate removed to expose the drum and the volume indicating dial, Figure 16 is a fragmentary vertical sectional view through the volume indicating dial and adjacent parts, Figure 17 is a vertical sectional view showing the device applied to a receiving set having a flat tuning dial instead of a drum, and Figure 18 is an end elevation of the pulleys and cords for operating the condensers of the modified form.

Referring now to the drawings in which like characters of reference designate similar parts in the various views, a radio receiving set is shown comprising a cabinet 10, having the usual front panel 11 and sub-panel 12. For the sake of clearness the tubes, condensers and other parts are not illustrated with the exception of certain parts operated by the mechanisms of the present invention.

Referring to Figure 2, 13 indicates a tuning drum, the shaft 14 of which carries the usual tuning condensers, not shown. The drum is secured by means of brackets 15 to the rear face of the front panel 11 and the graduations of the drum are visible through a sight opening 16 formed in the escutcheon plate 17 which is secured to the front face of the front panel 11 in the usual manner.

As best shown in Figure 15 and Figure 16, an opening 18 is formed in the front panel to receive a volume indicating dial 19 which is perforated near the outer edge preferably to produce numerals 1 to 5 inclusive, although letters or words may be substituted if desired. The numerals are designated in general by 20 and are exposed individually in sequence through a sight opening 21 in the escutcheon plate, when the dial is moved in either direction. The dial is fixed to a pivot shaft 22 which is rocked by a link 23 and a rod 24, operated by a mechanism which simultaneously operates the volume control rheostat as will presently be fully described. The numerals indicate the degree of volume at which the set is being operated since they correspond to the setting of the volume control rheostat. When the volume control rheostat is delivering its maximum resistance the numeral 1 appears in the sight opening and when it is delivering its minimum resistance, or the set is operating at full volume, the numeral 5 appears in the sight opening. Intermediate settings of the volume control rheostat are indicated by the corresponding numerals 2, 3 and 4, as will be understood.

A pilot light 25 is secured to one of the brackets 15 of the tuning drum by a bracket 26 and is connected by wires 27 to a switch 28 mounted on the underneath face of the sub-panel, which switch also controls the filament, plate and grid circuits, not shown. When the switch is closed, the pilot light illuminates both the transparent drum dial and the particular perforated numeral 20 of the volume indicating dial appearing at the sight opening 21 in the escutcheon plate.

Referring now to Figure 3 and Figure 14 a volume control rheostat 29 is shown secured to the underneath face of the sub-panel, and for the purpose of illustration, there is also shown a master rheostat 30 and a rheostat 31 all of which instruments may be connected to control circuits of the receiving set in the usual manner. A shaft 32 is secured by brackets 33 underneath the sub-panel and has fixed thereto pinions 34 which mesh with corresponding pinions 35 fixed to the actuating shafts 36 of the rheostats so that all these instruments will be operated in unison by the shaft. Stops 37 and 38 formed on the meshing pinions of the volume control rheostat 29 as best shown in Figure 14, limit movement of the shaft and the rheostats in either direction.

Disposed underneath the sub-panel is a casing 39 comprising side walls 40 and front and rear walls 41, the side walls being provided at the top with flanges 42 which are bolted as shown at 43 or otherwise secured to the sub-panel to secure the casing in place, the sub-panel being cut away as shown at 44 to provide an opening corresponding in shape to and receiving the open top of the casing. This casing houses the mechanisms for operating the tuning drum, the volume control, the filament lighting and the dial illuminating mechanisms as will now be described.

As best shown in Figures 4, 7 and 10 a shaft 45 is journaled in an opening in the rear wall 41 of the casing and is held against longitudinal movement by a collar 46 bearing against the inner face of the rear wall and a pulley 47 bearing against the outer face of the rear wall, this pulley being equipped with a cable 48 which serves to rotate the drum dial when the shaft is rotated to tune the receiving set, as will presently be more fully described.

A sleeve 49 is mounted to slide longitudinally on the shaft 45 and is journaled in an opening 50 formed in the front wall of the casing. The sleeve projects through an opening in the escutcheon plate and is terminally equipped with a knob 51 the securing collar 52 of which may be fixed to the sleeve by the usual screw in advance of the front face of the escutcheon plate.

A pair of collars 53 is fixed to the inner end of the sleeve by means of screws 54, these collars each having a pin 55 as best shown in Figures 7 and 8 which passes through a longitudinal slot 56 formed in the shaft 45. The purpose of these pins is to permit the sleeve to slide longitudinally of the shaft and also to secure the shaft for rotation as a unit with the sleeve at any outward position of the sleeve on the shaft. Disposed on the sleeve between the collars 53 is a collar 57 of the general shape shown in Figure 9, this collar having an opening 58 to loosely receive the sleeve and permit of the sleeve being rotated freely therein. The collar is provided on one side with a pin 59 and on the opposite side with a pin 60 and is further provided above the pin 59 with an opening 61. The collar 57 remains stationary on the sleeve and the purpose of this collar is to actuate mechanisms for operating the volume control rheostats, volume indicating dial, switch, but not the tuning drum, when the single knob 51 is being pulled out as will now be described.

Referring to Figure 3 it will be seen that a rock shaft 62 is journaled at one end in a bracket 63 secured to the bottom of the sub-panel and at the opposite end is journaled in openings in one side wall 40 and a longitudinal partition 64 spaced from the side wall within the casing as best shown in Figure 11. A segment 65 is secured to the rock shaft between the side wall and the partition and meshes with a segment 66 which is carried by a stub shaft 67 the ends of which are journaled in the side wall and the partition. As shown in Figure 4, the segment 66 is provided with fingers 68 and 69 which receive the above described pin 59 of the collar 57. It is now clear that when the knob 51 is pulled outwardly the collar will advance in the same direction and the pin 59 will rock the segment 66 which being in mesh with the segment 65 will rock the shaft 62. A link 70 is connected by a lever 71 to the rock shaft and by a lever 72 to the operating lever of the filament switch as best shown in Figure 5 and serves to communicate movement of the rock shaft in either direction to the switch lever and open or close the switch.

The inner face of the finger 69 is beveled as shown at 73 so that when the knob 51 is pulled outwardly sufficiently to close the switch, the pin 59 will ride over this beveled face and pass beyond the finger during the continued outward movement of the collar 57. In this position of the parts the switch 28 for controlling the pilot lamp circuit and the filament circuit is closed to illuminate the drum and indicating dial as well as light the tubes as will be understood. Movement of the knob 51 to its inner position reverses the movement of the collar 57 as above described to engage the pin 59 with the finger 68 and rock the segments 65 and 66 to open the switch as will be understood.

Referring now to Figure 6 and Figure 11 it will be seen that the volume control shaft 32 shown in Figure 3 passes through suitable openings in the side walls 40 of the casing and through a suitable opening in a longitudinal partition 74 within the casing. Fixed to the shaft is a pinion 75 which meshes with rack teeth 76 of a segment 77 which is pivoted on a stub shaft 78 the ends of which are journaled in suitable openings in the partition 74 and adjacent side wall 40. The volume control shaft 32 also passed through a suitable opening in the segment 77, as shown in Figure 6. The segment is provided with fingers 79 and 80 which receive the pin 60 of the collar 57, the finger 79 having an obliquely disposed terminal 81 over which the pin 60 rides during outward movement of the knob 51 to close the switch as above described. Further outward movement of the knob advances the collar 57 and places the pin 60 against the finger 80 so that during any further outward movement of the knob the segment 77 will be rocked to rotate the pinion 75 whereby the volume control shaft 32 is rotated to move the rheostats and increase the volume. Inward movement of the knob 51 reverses the movement of the parts as just described to move the rheostats and decrease the volume as desired.

Referring again to Figure 4 and Figure 10 it will be seen that an inverted T-shaped link 82 is pivoted on a stub shaft 83 secured in the partition 74 and the adjacent side wall of the casing. A horizontally disposed rod 84 has one end bent to loosely enter an opening in the link 82 as best shown in Figure 10 and the opposite end bent to loosely enter the opening 61 of the collar 57 whereby when the collar is moved the link 82 is rocked on its pivot. The link is connected to the rod 24 shown in Figures 15 and 16. When the knob 51 is pulled forwardly sufficiently to cause movement of the rheostats to diminish their resistance and increase the volume as above described, the link 82 will be rocked on its pivot thereby pulling the rod 24 downwardly and moving the volume indicating dial to display the numeral 2. In this position of the parts, the dial illuminating switch is closed, the volume control rheostat is turned to give nearly its greatest resistance and the volume indicating dial displays the numeral 2 to denote next to the lowest volume.

The tuning dial shaft may be turned at any outward position of the knob 51 in order to tune the set at any desired volume. To accomplish this the pulley 47 on the shaft 45 of the knob, as above stated, carries a cable 48 which is trained over idlers 85 and 86 and through grooves 87 formed in a pulley 88 that is fixed to the shaft 14 of the drum 13, the terminals of the cable being secured to pins 89 or otherwise in the side face of the pulley. Upon rotation of the knob at any outward position of the sleeve 49 on the shaft 45 the pulley 47 actuates the cable 48 to rotate the shaft 14 and drum 13 carried thereby. A stop 90 secured to the side of the pulley 88 engages the adjacent bracket 15 of the tuning drum and limits movement of the drum in either direction.

It is to be understood that when a flat tuning dial is used instead of a tuning drum, the mechanisms above described are equally applicable and in Figure 17 there is shown a flat tuning dial 91, the shaft 92 of which forms a continuation of the condenser shaft 93 as usual. A pulley 94 on the condenser shaft is in alinement with the above mentioned pulley 47 carried by the shaft of the knob 51 and a cable 95 is trained over both of these pulleys as shown best in Figure 18. Upon rotation of the knob 51 as above described the condenser and dial 91 will be rotated in the usual manner to tune the receiving set. A pilot light 96 is carried on a bracket 97 secured to the front panel 11 above the tuning dial as shown. As the remaining parts are identical with the mechanisms previously described, like numbers have been applied to these parts in the modified form shown in Figure 17 for the purpose of clearness and brevity.

In operation, let us assume that the receiving set is off and the knob 51 is at its innermost limit of movement as shown in Figure 4. The knob 51 is first pulled outwardly thereby moving forwardly the sleeve 49, collars 53, and collar 57, the pin 59 of the latter actuating the segment 65 and 66 to rock the shaft 62 and close the switch. During this time the pin 60 has been riding along the finger 81 and finally it strikes the finger 80 and actuates the segment 76 and pinion 75 rotate the volume control shaft 32 to move the volume control rheostat 29 to deliver substantially its maximum resistance or lowest volume. In this position of the parts, the pilot light is illuminating the tuning drum and numeral 1 of the volume control dial which has been brought into registry with the sight opening in the escutcheon plate by the rod 24, link 82 and rod 84, and the volume control rheostat is delivering its lowest volume. The set may now be tuned if desired by rotating the knob 51, the collar 57 remaining stationary while the collars 53 are rotated by the sleeve and through the instrumentality of the pins 55 carry with them the shaft 45 to rotate the pulley 47 and through the instrumentality of the cable 48 impart a corresponding movement to the condensers and the tuning drum.

Suppose it is desired to increase the volume of the set. The knob 51 is grasped and pulled outwardly substantially another half inch whereupon the movements of the parts above described again take place to advance the volume control rheostat to deliver greater volume and simultaneously move the volume control indicator until the numeral 2 appears illuminated in the sight opening of the escutcheon plate. It is understood that during this outward movement of the knob 51 the pin 59 of the collar 57 is passed over the beveled face 73 of the finger 69 as shown in Figure 4 and the switch 28 remains undisturbed. The set may again be tuned at this stage by simply rotating the knob as above described.

To shut off the set it is simply necessary to push the knob 51 inwardly until the pins 59 and 60 engage with the rear ends of the slots in the side walls 40 during which time the movements of the parts above described are reversed.

Having thus described the invention, I claim:

1. The combination in a radio receiving set of a control knob mounted for sliding and rotary movement, a circuit control switch, a volume indicating dial, a volume control rheostat, a tuning instrument, means operatively connecting the knob to the switch, means operatively connecting the knob to the dial, means operatively connecting the knob to the rheostat, all of said means coacting when the knob is slid to control the switch, the dial and the rheostat, and means operatively connecting the knob to operate the tuning instrument when the knob is rotated.

2. The combination in a radio receiving set of a control knob mounted for rotating and sliding movement, a volume indicating dial, a tuning instrument, a volume control rheostat, means operatively connecting said knob with said tuning instrument whereby when the knob is turned the tuning instrument is operated, means operatively connecting said knob with said dial, and means operatively connecting said knob with said rheostat, both of the last named means operating simultaneously when the knob is slid to operate said dial and said rheostat.

3. The combination in a radio receiving set of a rotating shaft, a sleeve sliding on said shaft, a knob on the outer end of said sleeve, a pin on said sleeve fitting in a longitudinal slot in said shaft to secure the shaft and sleeve for rotation as a unit at any point in the sliding movement of the sleeve, a tuning instrument, a volume control rheostat, means operatively connecting the tuning instrument with said shaft whereby when the shaft is rotated by said knob said instrument is operated, and means operatively connecting said rheostat with said sleeve whereby when the sleeve is slid by said knob said rheostat is operated.

4. The combination in a radio receiving set of a rotating shaft, a sleeve sliding thereon, a knob fixed on the outer end of said sleeve, a pin on said sleeve fitting in a longitudinal slot in said shaft for locking the shaft and the sleeve for rotation as a unit, a stationary collar carried by said sleeve, a tuning instrument, a volume control rheostat, a volume indicating dial, means operatively connecting said shaft with said tuning instrument whereby when the knob is turned said instrument is operated, means operatively connecting said stationary collar with said rheostat whereby when the knob is slid the rheostat is operated, and means operatively connecting said collar with said dial whereby when the knob is slid said dial is operated.

5. The combination in a radio set of a rotatable shaft, a sleeve sliding on said shaft and adapted to rotate the shaft, a knob on the outer end of the sleeve, a collar loosely fitted on the inner end of the sleeve, a switch for controlling a circuit, a volume control rheostat, a tuning instrument, gear mechanism operated by said collar for operating the switch when the knob is slid, gear mechanism operated by the collar for operating the volume control rheostat when the knob is slid, and means operatively connecting said shaft with said tuning instrument whereby when the shaft is turned by said knob said instrument is tuned.

6. In a radio receiving set, a volume indicating dial having indicating characters, a pilot light to illuminate said characters, a switch for controlling the pilot light circuit, a volume control rheostat, a tuning instrument, a rotatable shaft operatively connected to the tuning instrument for tuning the same, a sleeve adapted to rotate the shaft and sliding on the shaft, a knob for manipulating said sleeve, and means operated by said sleeve to operate the switch, the volume control rheostat and the volume indicating dial when the knob is pulled outwardly or pushed inwardly.

7. In a radio receiving set, a pivoted volume indicating dial, a tuning drum, a pilot light for illuminating the drum and the dial, a switch for controlling the pilot light circuit, a volume control rheostat, and a single knob mounted for sliding and rotary movement and operatively connected to operate the switch, the volume control rheostat and the dial when slid and operatively connected to operate the tuning drum when rotated.

In testimony whereof I affix my signature.

CHARLES J. BREHANY.